United States Patent Office 3,189,652
Patented June 15, 1965

3,189,652
POLYMERIC REACTION PRODUCTS OF AMINES AND EPIHALOHYDRINS
Ernest L. Pollitzer, Hinsdale, Ill., assignor to Universal Oil Products Company, Des Plaines, Ill., a corporation of Delaware
No Drawing. Filed Dec. 14, 1960, Ser. No. 75,676
8 Claims. (Cl. 260—584)

This application is a continuation-in-part of my copending and now abandoned application Serial No. 712,314 filed January 31, 1958 which in turn is a continuation-in-part of application Serial No. 647,200 filed March 20, 1957, now patent No. 3,017,258, January 16, 1962, and relates to a novel reaction product and to the manufacture thereof.

In one embodiment the present invention relates to the polymeric reaction product of from 1 to 2 mol proportions of an aliphatic primary amine, having at least 12 carbon atoms and a straight chain of at least three carbon atoms attached to the nitrogen atom, with from 1 to 1.5 mol proportions of an epihalohydrin compound, said reaction product being formed at a temperature of from about 20° to about 100° C. and thereafter reacted with an inorganic base at a temperature of from about 55° to about 100° C., thereby liberating the free amine, followed by heating and reacting to form said polymeric reaction product containing from 3 to 20 recurring units.

In a specific embodiment the polymeric reaction product is formed by the reaction of tallow amine with epichlorohydrin.

In still another specific embodiment the polymeric reaction product is formed by the reaction of N-tallow-1,3-diaminopropane with epichlorohydrin.

From the above embodiment it will be seen that there are a number of essential requirements in order to form the novel polymeric reaction product of the present invention.

It is essential that the amine used in forming the reaction product meets certain specific requirements to be hereinafter set forth in detail. It is essential that the amine is a primary amine and that the amine and the epihalohydrin compound are reacted in certain critical mol ratios and in the presence of a hydroxylic solvent. It is essential that the reaction be effected in a critical sequence of steps. The first reaction, which may be effected in one and preferably in two steps, forms an intermediate product and this intermediate product then must be reacted with an inorganic base to convert the organic halide salt to an inorganic halide salt, thereby liberating the free amine for further reaction to the desired polymeric product. The final heating and reacting must be effected at a temperature of from about 55° to about 100° C. As will be shown by the examples appended to the present specifications, the polymeric reaction product formed in accordance with the present invention is of special utility as an additive to hydrocarbon oils.

As hereinbefore set forth, it is essential that a primary amine is used in preparing the reaction product and that the amine contains at least 12 carbon atoms and preferably at least 15 carbon atoms. Generally the total number of carbon atoms in the amine will not exceed about 40 carbon atoms per molecule. As will be shown in the appended examples, reaction products prepared from amines containing less than 12 carbon atoms are not satisfactory for effecting the desired improvements in the burner oil and, therefore, are not suitable for use in the present invention. Furthermore, it is essential that a straight chain of at least 3 carbon atoms must be attached to the nitrogen atom of the amine in order to obtain the improved results of the present invention. In other words, the alkyl group attached to the nitrogen atom is of normal configuration and not secondary, tertiary, or of cyclic configuration. However, the alkyl group may contain branching in the chain provided such branching occurs on the fourth carbon atom from the nitrogen atom or further distant therefrom.

Any suitable aliphatic amine meeting the requirements set forth herein may be used in preparing the additive of the present invention. It is essential that the amine is a primary amine, that is, only one of the hydrogen atoms attached to the nitrogen atom is substituted by an aliphatic group or that, in the case of polyamines, there are at least two NH groups, in order to form the desired polymeric reaction product. Thus, the two NH groups may be considered as the equivalent of a $NH_2$ or primary amine group. In other words, a H—N—H group may be considered as comprising N—H and N—H. Secondary mono-amines (only one N—H group) and tertiary amines (no hydrogen atoms attached to the nitrogen atom) cannot be used to form the desired polymeric reaction product of the present invention. It is understood that the term "aliphatic amine" is used in the present specifications and claims to include alkyl primary amines, alkenyl primary amines, polyamines, N-alkyl polyamines, N-alkenylpolyamines, N.N'-dialkyl polyamines, N.N'-dialkenyl polyamines, etc., all of which meet the requirements hereinbefore set forth.

Illustrative examples of primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing 16 to 18 carbon atoms per alkyl group, although they contain a small amount of alkyl groups having 14 carbon atoms, and also meet the other requirements hereinbefore set forth.

Preferred examples of N-aliphatic polyamines comprise N-alkyl-1,3-diaminopropanes in which the alkyl group contains at least 12 carbon atoms and a straight chain of at least 3 carbon atoms attached to the nitrogen atom. Illustrative examples include N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane, N-eicosyl-1,3-diaminopropane, N-heneicosyl-1,3-diaminopropane, N-docosyl-1,3-diaminopropane, N-tricosyl-1,3-diaminopropane, N-tetracosyl-1,3-diaminopropane, N-pentacosyl-1,3-diaminopropane, N-hexacosyl-1,3-diaminopropane, N-heptacosyl-1,3-diaminopropane, N-octacosyl-1,3-diaminopropane, N-nonacosyl-1,3-diaminopropane, N-tricontyl-1,3-diaminopropane, N-hentriacontyl-1,3-diaminopropane, N-dotriacontyl-1,3-diaminopropane, N-tritriacontyl-1,3-diaminopropane, N-tetratriacontyl-1,3-diaminopropane, N-pentatriacontyl-1,3-diaminopropane, N-hexatriacontyl-1,3-diaminopropane, N-heptatriacontyl-1,3-diaminopropane, N-octatriacontyl-1,3-diaminopropane, N-nonatriacontyl-1,3-diaminopropane, N-tetracontyl-1,3-diaminopropane, etc. and corresponding N-alkenyl-1,3-diaminopropanes. As before, mixtures are available commercially, usually at lower prices, of suitable compounds of this class and advantageously are used for the purposes of the present invention. One such mixture is "Duomeen T" which is N-tallow-1,3-diaminopropane and predominates in alkyl and alkenyl groups containing from 16 to 18 carbon atoms each, although the mixture contains a small amount of groups containing 14 carbon atoms each. Another mixture available commercially is N-coco-1,3-diaminopropane which contains alkyl groups predominating in 12 to 14 carbon atoms each. Still another example is N-soya-1,3-diaminopropane which predominates in alkenyl groups containing 18 carbon atoms per group, although it contains a small amount of alkyl groups having 16 carbon atoms each. However, such mixtures can be used only if they do not contain a branched chain configuration in proximity to the nitrogen atoms as hereinbefore set forth.

While the N-aliphatic-1,3-diaminopropanes are preferred compounds of this class, it is understood that suitable N-aliphatic ethylene diamines, N-aliphatic-1,3-diaminobutanes, N-aliphatic-1,4-diaminobutanes, N-aliphatic-1,3-diaminopentanes, N-aliphatic-1,4-diaminopentane, N-aliphatic-1,5-diaminopentanes, N-aliphatic-1,3-diaminohexanes, N-aliphatic-1,4-diaminohexanes, N-aliphatic-1,5-diaminohexanes, N-aliphatic-1,6-diaminohexanes, etc. may be employed, but not necessarily with equivalent results. Also, it is understood that polyamines containing 3 or more nitrogen atoms may be employed provided they meet the requirements hereinbefore set forth. Illustrative examples of such compounds include N-dodecyl-diethylene triamine, N-tridecyl-diethylene triamine, N-tetradecyl-diethylene triamine, etc., N-dodecyl-dipropylene triamine, N-tridecyl-dipropylene triamine, N-tetradecyl-dipropylene triamine, etc., N-dodecyl-dibutylene triamine, N-tridecyl-dibutylene triamine, N-tetradecyl-dibutylene triamine, etc., N-dodecyl-triethylene tetramine, N-tridecyl-triethylene tetramine, N-tetradecyl triethylene tetramine, etc., N-dodecyl-tripropylene tetramine, N-tridecyl-tripropylene tetramine, N-tetradecyl-tripropylene tetramine, etc., N-dodecyl-tributylene tetramine, N-tridecyl-tributylene tetramine, N-tetradecyl-tributylene tetramine, etc., N-dodecyl-tetraethylene pentamine, N-tridecyl-tetraethylene pentamine, N-tetradecyl-tetraethylene pentamine, etc., N-dodecyl-tetrapropylene pentamine, N-tridecyl-tetrapropylene pentamine, N-tetradecyl-tetrapropylene pentamine, etc., N-dodecyl-tetrabutylene pentamine, N-tridecyl-tetrabutylene pentamine, N-tetradecyl-tetrabutylene pentamine, etc. and corresponding N-alkenyl polyamines.

As hereinbefore set forth, the amine compound is reacted with an epihalohydrin compound. Epichlorohydrin is preferred. Other epichlorohydrin compounds include 1,2-epoxy-4-chlorobutane, 2,3-epoxy-4-chlorobutane, 1,2-epoxy-5-chloropentane, 2,3-epoxy-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent and that, as hereinbefore set forth, epichlorohydrin is preferred.

As hereinbefore set forth, it is essential that the amine is reacted with the epihalohydrin compound in a mol ratio of from 1 to 2 mol proportions of amine to 1 to 1.5 mol proportions of epihalohydrin compound. When the reactants are reacted in proportions outside of this range, difficulty is experienced either in formation of gelatinous materials and/or in undesired cross linkage. As hereinbefore set forth, the desired product of the present invention is a polymeric reaction product containing from 3 to 20 or more recurring units and preferably from about 5 to about 15 recurring units. In a particularly preferred embodiment of the invention, a monoamine is reacted with epichlorohydrin in equal mol proportions and a diamine is reacted with epichlorohydrin in the ratio of 1 mol of diamine to 1.25 mols of epichlorohydrin.

The desired quantity of amine and epihalohydrin compounds may be supplied to the reaction zone and therein reacted, although generally it is preferred to supply one reactant to the reaction zone and then introduce the other reactant step-wise. Thus, usually it is preferred to supply the epichlorohydrin to the reaction zone and to add the amine step-wise, with stirring. Preferably the reaction of epichlorohydrin with the second or later portions of amine is effected at a higher temperature than with the first portion of the amine. The reaction is effected in the presence of a hydroxylic solvent and, in the preferred embodiment, a solution of the amine in a solvent and a separate solution of the epihalohydrin compound in a solvent are prepared, and these solutions then are commingled in the manner hereinbefore set forth, at least one of the solvents being hydroxylic. Any suitable hydroxylic solvent may be employed, a particularly suitable solvent comprising an alcohol including ethanol, propanol, butanol, etc., 2-propanol being particularly desirable. Other hydroxylic solvents comprise glycols including ethylene glycol, propylene glycol, etc., glycerols, etc.

The reaction of amine compound and epihalohydrin compound is effected at any suitable temperature, which generally will be within the range of from about 20° to about 100° C. and preferably is in the range of from about 50° to about 85° C. Conveniently, this reaction is effected by heating the epichlorohydrin solution in dilute alcohol at refluxing conditions, with stirring, gradually adding the amine thereto, and continuing the heating, preferably at a higher temperature, until the reaction is completed, or the reverse order of adding the reactants.

As hereinbefore set forth, after the reaction of the amine compound and epihalohydrin compound is completed, it is essential to convert the resultant organic halide salt to an inorganic halide salt and to thereby liberate the free amine for further reaction to form the desired polymeric product. This may be effected in any suitable manner and generally is accomplished by reacting the primary reaction product with a strong inorganic base such as sodium hydroxide, potassium hydroxide, etc. to form the corresponding metal halide. The reaction to form the metal halide is effected at a temperature within the range of from about 55 to about 100° C. and preferably from about 75 to about 90° C. The inorganic base preferably is added in at least two steps with intervening heating and reacting so that organic halide formed after the first addition of inorganic base is in turn reacted to liberate the free amine.

In one embodiment the product at this stage of manufacture may be withdrawn from the reaction zone and filtered or otherwise treated to remove the inorganic halide. Generally however it is preferred to perform the next step in the same reaction zone without removing the inorganic halide. At the conditions used in forming the polymeric reaction product, the inorganic halide is inert and, therefore, its presence is not objectionable. Regardless of whether or not the inorganic halide is removed, the primary reaction product of the amine compound and epihalohydrin compound is now further heated and reacted in order to form the desired linear polymeric reaction product. This further heating and reacting is at a temperature of from about 55° to about 100° C. and preferably from about 75° to about 90°.

It will be seen that it is essential in the second step (after all of the amine has reacted with epichlorohydrin) to convert the organic halide salt, which is formed in the first step, in order to liberate the amine so that it may further react and polymerize in the final step to form the desired polymeric reaction product.

After formation of the desired polymeric reaction product or before this step as mentioned above, the inorganic halide salt is removed in any suitable manner, including filtering centrifugal separation, etc. In some cases, it may be of advantage to effect the filtration at an elevated temperature which may range from about 35° to about 70° C. or more.

The reaction products prepared in the above manner are new compositions of matter and possess unexpected properties over related but different compositions of the prior art. As hereinbefore set forth, the product of the present invention is a polymeric reaction product having from 3 to 20 or more, preferably from 5 to 15, recurring units. The reaction products will range from liquids to solids and, when desired, may be prepared as a solution in a suitable solvent for ease of handling and using. A preferred solvent is an aromatic hydrocarbon including benzene, toluene, xylene, ethylbenzene, cumene, etc. or a mixed solvent including naphtha, kerosene, etc. In one embodiment all or a portion of the aromatic solvent desired in the final product may be used as a solvent in addition to the hydroxylic solvent, during the reaction, and the aromatic solvent is allowed to remain in the final product.

The reaction products of the present invention will have varied utility and are particularly advantageous for use as an additive in burner oil. The term "burner oil" is used in the present specifications and claims to include hydrocarbon distillates boiling within the range of from about 300° F. to about 750° F. These burner oils are marketed under various trade names such as burner oil, fuel oil, furnace oil, diesel oil, etc., and are used principally in burner systems, diesel and combustion engines, and various other industrial and domestic equipment. Also specifically included in this classification are jet fuels or other hydrocarbon distillates containing components boiling within the range hereinbefore set forth and also containing lower boiling components. Jet fuels, for example, may have an initial boiling point as low as about 60° F. and an end boiling point within the range of from about 450° F. to about 600° F. or higher.

In storage the burner oil undergoes deterioration, with the formation of sediment, undesired discoloration, etc. The formation of sediment is objectionable because the sediment tends to plug strainers, burner tips, injectors, etc., and, when used as diesel fuel, tends to form varnish and sludge in the diesel engine. Discoloration of burner oils is objectionable for various reasons, including the customers' preference for light colored oils. Deterioration of jet fuel and burner oil at high temperature also is a serious problem. For example, jet fuel is used as a heat exchange medium for the lubricating oil, and deterioration of the jet fuel results in plugging of the exchanger coils.

Burner oils present a difficult problem because of the wide variations in stability, apparently due to the many different sources from which burner oils are obtained. The formation of sediment and discoloration in storage vary considerably with the geographic source of the burner oil and with the treatment that the burner oil has received at the refinery. At present burner oils come principally from nondestructive distillation of petroleum oil and are commonly referred to in the art as straight run distillates, and from non-catalytic and catalytic cracking processes and are commonly referred to in the art as cycle stocks, the latter term being used because the burner oil is separated from a fraction which otherwise would be recycled to the cracking process for further conversion therein. Other sources of burner oils may include those produced by the reaction of carbon monoxide with hydrogen, in such processes as the Fischer-Tropsch process, Synthesis process, etc. The stability problems of burner oils become complicated further when the burner oil comprises a blend of two or more different oils. Deterioration of the burner oil is retarded or prevented by incorporating therein an additive of the present invention.

While the improvement desired in burner oils may take the form of reduced sediment formation, retarded discoloration, etc., as hereinbefore set forth, satisfactory improvement also may be obtained in a somewhat different manner. One of the primary objectives is that the burner oil will not clog strainers, burner tips, injectors, etc., and this objective also may be attained by suitably dispersing the particles in the burner oil so that they will be small enough to pass through the restricted zones without clogging thereof. Therefore, while the actual sediment content may be the same or larger, it is present in such a finely divided form that the burner oil may be satisfactorily used without experiencing clogging difficulties. It has been found and will be shown in the following examples that the additives of the present invention effect improvements in certain fuel oils by this method.

The polymeric reaction product is incorporated in the burner oil in a stabilizing concentration which will be below about 1% by weight and within the range of from 0.0001% to about 1% and generally from about 0.001% to about 0.5% by weight. It is understood that this additive may be used in conjunction with other additives, such as metal deactivators, antioxidants, synergists, cetane improvers, rust inhibitors, etc. Furthermore, it is understood that the additive may be prepared as a solution in a suitable solvent. In some cases, one or more of the other additives to be incorporated in the burner oil is prepared as a solution in a solvent and, when desired, the additive of the present invention may be prepared as a mixture with one or more other additives, preferably as a solution in a suitable solvent, and the same marketed as a single commodity of multiple purposes.

The following examples are introduced to illustrate further the novelty and utility of the present invention but not with the intention of unduly limiting the same.

EXAMPLE I

A polymeric reaction product was prepared as follows: 1 mol proportion of epichlorohydrin was reacted with 1 mol proportion of hydrogenated tallow amine ("Armeen HTD"). The reaction was effected by first forming a solution of 2 mols of epichlorohydrin in 600 cc. of a solvent mixture comprising 400 cc. of xylene and 200 cc. of 2-propanol. A separate solution of 2 mols of Armeen HTD was prepared in an equal volume of xylene. One mol of the latter solution was added gradually to the epichlorohydrin solution with stirring and heating at 55°–60° C. for a period of 2.5 hours. Then another mol of Armeen HTD was added gradually to the reaction mixture, stirred and reacted at 80° C. for 2.5 hours. One mol of sodium hydroxide then was added with stirring and heating at 85°–90° C. for 3.5 hours, after which another mol of sodium hydroxide was added and the mixture stirred and reacted at 85°–90° C. for one hour.

It will be seen that the heating and reacting after the addition of and reaction with the sodium hydroxide and concomitant liberation of the free amine results in the formation of the desired polymeric reaction product. Following completion of the reaction, the mixture was cooled, filtered, and the filtrate then was distilled to remove the alcohol. In this case the xylene solvent was allowed to remain in the final product as it was intended to use the solution as an additive to burner oil.

However, for analytical purposes, a portion of the above solution was distilled at 0.1 mm. of vacuum to remove the xylene and to recover a substantially pure reaction product. This product is a white to off-white hard, brittle solid, and has a softening point of about 43° C. and melts at 51° C. to a dark yellow liquid, which liquid is soluble in all common hydrocarbons and other organic solvents. This product has equivalent weight by titration with acid of 334.

The number of polymer molecules may be determined by analyzing for secondary nitrogen groups which are the end groups. By determining the number of secondary nitrogen end groups, the size of the molecule can be calculated. Such an analysis of the preparation described above calculates to a total of 12 recurring units and represents a molecular weight of about 6600.

The reaction product prepared in the above manner was tested in a method referred to as the "Erdco Test" now called the CFR Fuel Coker Test. In this method, heated oil is passed through a filter, and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits that the test is stopped after about 300 minutes and the differential pressure at that time is reported.

0.01% by weight of the reaction product prepared in the above manner was evaluated in a commercial range oil in the Erdco Test and gave a differential pressure across the filter after 300 minutes of 0.2 in. Hg. In contrast, the sample of oil without this additive gave a differential pressure of 25 in. Hg in about 120 minutes.

EXAMPLE II

It will be noted that in Example I the first mol of tallow amine was reacted with epichlorohydrin at 55°–60° C. and then the second mol of tallow amine was reacted at the higher temperature of 80° C. When effecting the reaction in this manner, the polymeric material described in Example I is produced. However, when the reaction of all the constituents is effected at substantially the same temperature, the product generally will contain 5 or less recurring units. A specific preparation was analyzed and calculated to comprise 4 recurring units and a molecular weight of about 1400.

EXAMPLE III

The polymeric reaction product of this example is formed by the reaction of 1 mol proportion of "Duomeen T" and 1.25 mol proportions of epichlorohydrin. As hereinbefre set forth, "Duomeen T" is N-tallow-1,3-diaminopropane and predominates in alkyl groups containing 16 to 18 carbon atoms each. 115 grams of epichlorohydrin, 180 grams of isopropyl alcohol and 159 grams of xylene are loaded into a reaction vessel and the temperature is raised to about 45° C. 180 grams of "Duomeen T" and 135 grams of xylene are supplied to the reaction vessel while maintaining the temperature at about 50° C. The reaction vessel then is heated to 75° C. and maintained at this temperature for four hours, after which the remaining amine (180 grams) and 135 grams of xylene are supplied to the reaction vessel and then heated for four hours. Following this primary reaction, 34 grams of sodium hydroxide are added gradually to the reaction vessel which is heated to 85° C. and maintained at this temperature for four hours, after which 17 grams of sodium hydroxide are added gradually to the reaction vessel and maintained at 85° C. for another four hours. Here again, it will be seen that the continued reaction at the elevated temperature after the addition of the sodium hydroxide serves to effect polymerization of the primary reaction product because of the liberation of the free amine. Following the reaction, the vessel is cooled and the products are filtered to remove the inorganic halide salt and the filtrate then is distilled to remove the isopropyl alcohol solvent.

EXAMPLE IV

The reaction product of this example was prepared by the reaction of 2 mols of hydrogenated tallow amine (Alamine H26D) with 1 mol of epichlorohydrin. It will be noted that the tallow amine is a mixture of primary amines predominating in 16 to 18 carbon atoms per alkyl group. The amine was prepared as a dilute solution in 2-propanol and was supplied to an autoclave and heated to reflux, with stirring. One mol of epichlorohydrin, separately prepared as a solution in 2-propanol, was added gradually to the autoclave and the heating and mixing were continued for about 1.5 hours to insure complete reaction. Thereafter, 1 mol of sodium hydroxide was added to the autoclave, and the heating and stirring were continued. After completion of the reaction, the mixture was filtered hot to remove sodium chloride, and the filtrate then was distilled to remove the alcohol solvent. The remaining product was a cream colored solid and was recrystallized from hot ethanol to give a white amorphous solid having a softening point of 45° C. and melting at about 67° C. to a clear light yellow liquid, which is soluble in benzene, 2-propanol, etc.

0.001% by weight of the reaction product prepared in the above manner was incorporated in a sample of commercial range oil and run in the "Erdco Test." After 300 minutes, the differential pressure across the filter was 0.6 in. Hg. On the other hand, a control sample (not containing this additive) reached a differential pressure across the filter of 25 in. Hg in about 120 minutes.

EXAMPLE V

As hereinbefore set forth, it is essential that the alkyl amine contains at least 12 carbon atoms in the alkyl group and has a straight chain of at least 3 carbon atoms adjoining the nitrogen atom. This is illustrated by comparing the results of Example IV with the results reported in this example of reaction products prepared from amines not meeting this requirement. All of the reactions were effected in substanitally the same manner as described in Example IV except, of course, for the amine utilized. They were prepared by the reaction of 2 mols of amine with 1 mol of epichlorohydrin. The first amine used is octyl amine which, it will be noted, does not contain at least 12 carbon atoms in the alkyl group. The second amine employed is a tertiary alkyl primary amine containing about 18 carbon atoms in each alkyl group and is available commercially as "Alkylamine JM." The third amine used is p-dodecyl aniline, in which, it will be noted, a nitrogen atom is attached to an aromatic configuration. The fourth amine is rosin amine, in which the nitrogen atom is attached to an alicyclic structure, this amine being available commercially under the trade name of "Rosin Amine D." Each additive was used in a concentration of 0.001% by weight of the range oil. The results of runs made in the "Erdco Test" are reported in the following table:

*Table I*

| No. | Amine used in preparation | Minutes/ In. Hg |
|---|---|---|
| 1 | Octyl amine | 135/25 |
| 2 | Tertiary alkyl amine | 128/25 |
| 3 | Dodecyl aniline | 118/25 |
| 4 | Rosin amine | 300/7.2 |

From the data in the above table, it will be noted that none of the above reaction products is satisfactory for use in preventing deterioration of range oil. In contrast, the use of the reaction product described in Example IV resulted in only 0.6 in. Hg after 300 minutes.

EXAMPLE VI

This example illustrates the reaction of three mols of hydrogenated tallow amine with two mols of epichlorohydrin. This reaction was effected by adding gradually 1 mol of tallow amine in propanol solution to a stirred solution of 2 mols of epichlorohydrin in 2-propanol at 60°–65° C. After the addition of the primary amine, the mixture was refluxed and then 2 mols of tallow amine were added gradually to the mixture following which 2 mols of sodium hydroxide were added, and the mixture then was further reacted, after which the reaction product was filtered and the filtrate was distilled to remove the solvent. This reaction product was a pale yellow solid, having a softening point of 55° C. and melting to a pale yellow opaque liquid at about 65° C. which, upon heating to 74° C., clears to a transparent yellow liquid, soluble in toluene, warm benzene, 2-propanol, hot ethanol, etc.

0.001% by weight of the reaction product described above was incorporated in another sample of the range oil described in Example IV. When run in the Erdco Test, the differential pressure across the filter after 300 minutes was 0.3 in. Hg.

EXAMPLE VII

As hereinbefore set forth, stability problems of different burner oils vary considerably. In the present example, a burner oil comprising a blend of 85% commercial fuel oil and 15% cracked gasoline was employed. When run in the Erdco Test, this oil developed a differential pressure of 25 in. Hg in about 50 minutes. It will be noted that this blended burner oil is of considerably poorer stability than the range oil used in the previous examples.

A number of different reaction products were prepared and tested in this burner oil, and the results are reported in the following table. These reaction products were prepared in substantially the same manner as described in previous examples. In the interest of simplicity, the specific details of preparation are omitted, but the reactants and quantities thereof are shown in the table. The reaction products each were utilized in the fuel oil in a concentration of 0.001% by weight. These runs were discontinued after 180 minutes.

Table II

| No. | Amine | | Epichloro-hydrin, Mols | Min./In. Hg |
|---|---|---|---|---|
| | Mols | Compound | | |
| 5 | None | None | None | 50/25 |
| 6 | 2 | Tallow amine | 1 | 180/0.6 |
| 7 | 3 | do | 2 | 180/0.4 |
| 8 | 2 | N-tallow-1,3-diamino propane | 2 | 180/0.3 |

From the data in the above table, it will be noted that the various reaction products prepared in accordance with the present invention were effective in retarding deterioration of the burner oil.

EXAMPLE VIII

In another method of evaluating the additives, samples of the burner oil were stored at 100° F. for about 45 days and the mg./100 ml. of sediment was determined after such storage. The burner oil used in this example is a No. 2 commercial fuel oil. In the test using the additive, the additive was used in a concentration of 0.01% by weight of the fuel oil. The results are shown in the following table:

Table III

| No. | Amine | | Epichloro-hydrin, Mols | Days Stored | Mg./100 ml. |
|---|---|---|---|---|---|
| | Mols | Compound | | | |
| 9 | None | None | None | 43 | 8.7 |
| 10 | 2 | N-tallow-1,3-diamino propane | 2 | 46 | 0.5 |

From the data in the above table it will be noted that a considerable reduction in sediment formation was obtained by using a reaction product of the present invention.

Furthermore, when evaluated in a test wherein the different samples of the oil with and without additives, after storage at 100° F. for about 45 days, are passed through a 400 wire mesh screen, and the times for the successive 400 ml. portions to pass through the screen are recorded, it was found that the oil containing the additives of the present invention had times of about one-half or less than the sample of oil not containing the additives. This further shows that the additives serve to prevent plugging of filters, tips, ejectors, etc.

I claim as my invention:

1. The polymeric reaction product formed by reacting at a temperature of from 20° to 100° C. from 1 to 2 mol proportions of an aliphatic amine selected from the group consisting of primary amines and amines having at least two N—H groups, and consisting of carbon, hydrogen and amino nitrogen and having from 12 to 40 carbon atoms and a straight chain of from 3 to 40 carbon atoms attached to a nitrogen atom, with from 1 to 1.5 mol proportions of an epihalohydrin compound selected from the group consisting of epichlorohydrin, 1,2-epoxy-4-chlorobutane, 2,3-epoxy-4-chlorobutane, 1,2-epoxy-5-chloropentane, 2,3-epoxy-5-chloropentane, and corresponding bromo and iodo compounds in the presence of a hydroxylic solvent selected from the group consisting of monohydric alcohols, glycols and glycerols, thereafter reacting with an inorganic base at a temperature of from 55° to 100° C. to liberate the free amine, thereby forming an inorganic halide salt, further heating and reacting at a temperature of from 55° to 100° C. to form said polymeric reaction product containing from 3 to 20 recurring units, and filtering to remove said inorganic halide salt.

2. The polymeric reaction product formed by reacting at a temperature of from 20° to 100° C. from 1 to 2 mol proportions of an aliphatic primary amine consisting of carbon, hydrogen and amine nitrogen and having from 12 to 40 carbon atoms and a straight chain of from 3 to 40 carbon atoms attached to a nitrogen atom, with from 1 to 1.5 mol proportions of epichlorohydrin in the presence of an alcoholic solvent, thereafter reacting with an inorganic base at a temperature of from 55° to 100° C. to liberate the free amine, thereby forming an inorganic halide salt, further heating and reacting at a temperature of from 55° to 100° C. to form said polymeric reaction product containing from 3 to 20 recurring units, and filtering to remove said inorganic halide salt.

3. The polymeric reaction product formed by reacting at a temperature of from 50° to 85° C. 1 mol proportion of an alkyl primary monoamine, consisting of carbon, hydrogen and amino nitrogen and having from 12 to 40 carbon atoms and a straight chain of from 3 to 40 carbon atoms attached to the nitrogen atom, with 1 mol proportion of epichlorohydrin the presence of an alcoholic solvent, thereafter reacting with sodium hydroxide at a temperature of from 75° to 90° C. to liberate the free amine, thereby forming an inorganic halide salt, further heating and reacting at a temperature of from 75° to 90° C. to form said polymeric reaction product containing from 3 to 20 recurring units, and filtering to remove said inorganic halide salt.

4. The polymeric reaction product formed by reacting at a temperature of from 50° to 85° C. 1 mol proportion of an N-aliphatic-diaminoalkane consisting of carbon, hydrogen and amino nitrogen and having from 12 to 40 carbon atoms and a straight chain of from 3 to 40 carbon atoms attached to a nitrogen atom with 1.25 mol proportions of epichlorohydrin in the presence of an alcoholic solvent, thereafter reacting with sodium hydroxide at a temperature of from 75° to 90° C. to liberate the free amine, thereby forming an inorganic halide salt, further heating and reacting at a temperature of from 75° to 90° C. to form said polymeric reaction product containing from 3 to 20 recurring units, and filtering to remove said inorganic halide salt.

5. The polymeric reaction product formed by reacting at a temperature of from 50° to 85° C. 1 mol proportion of tallow amine with 1 mol proportion of epichlorohydrin in the presence of isopropanol, thereafter reacting with sodium hydroxide at a temperature of from 75° to 90° C. to liberate the free amine, thereby forming an inorganic halide salt, further heating and reacting at a temperature of from 75° to 90° C. to form said polymeric reaction product containing from 5 to 15 recurring units, and filtering to remove said inorganic halide salt.

6. The polymeric reaction product formed by reacting at a temperature of from 50° to 85° C. 1 mol proportion of N-tallow-1,3-diaminopropane with 1.25 mol proportions of epichlorohydrin in the presence of isopropanol, thereafter reacting with sodium hydroxide at a temperature of from 75° to 90° C. to liberate the free amine, thereby forming an inorganic halide salt, further heating and reacting at a temperature of from 75° to 90° C. to form said polymeric reaction product containing from 5 to 15 recurring units, and filtering to remove said inorganic halide salt.

7. The process which comprises commingling 1 mol proportion of an aliphatic amine selected from the group consisting of primary amines and amines having at least two N—H groups and consisting of carbon, hydrogen and amino nitrogen and having from 16 to 18 carbon atoms and a straight chain of from 3 to 18 carbon atoms attached to a nitrogen atom, with 2 mol proportions of epichlorohydrin in the presence of an alcoholic solvent and reacting the mixture at a temperature of from 20° to 100° C., then adding another mol proportion of an alkyl amine containing 16 to 18 carbon atoms and having a straight chain of from 3 to 18 carbon atoms attached to the nitrogen atom, and reacting the same at a temperature within the range of from 20° to 100° C. but higher than the temperature used in the first mentioned reaction, thereafter reacting with a first portion of an inorganic base at a temperature of from 55° to 100° C. and then with a second portion of an inorganic base, thereby forming an inorganic halide salt, further heating and reacting at a temperature of from 55° to 100° C. to thereby form a polymeric reaction product containing from 3 to 20 recurring units, and filtering to remove said inorganic halide salt.

8. The polymeric reaction product formed by reacting at a temperature of from 20° to 100° C. from 1 to 2 mol proportions of an aliphatic amine selected from the group consisting of primary amines and amines having at least two N—H groups, and consisting of carbon, hydrogen and amino nitrogen and having from 12 to 40 carbon atoms and a straight chain of from 3 to 40 carbon atoms attached to a nitrogen atom, with from 1 to 1.5 mol proportions of epichlorohydrin in the presence of a hydroxylic solvent selected from the group consisting of mono-hydric alcohols, glycols and glycerols, thereafter reacting with an inorganic base selected from the group consisting of sodium hydroxide and potassium hydroxide at a temperature of from 55° to 100° C. to liberate the free amine, thereby forming an inorganic halide salt, further heating and reacting at a temperature of from 55° to 100° C. to form said polymeric reaction product containing from 3 to 20 recurring units, and filtering to remove said inorganic halide salt.

References Cited by the Examiner

UNITED STATES PATENTS

| | | | |
|---|---|---|---|
| 2,469,683 | 5/49 | Dudley et al. | 260—584 X |
| 2,694,629 | 11/54 | Reynolds | 260—584 X |
| 2,891,970 | 6/59 | Frank et al. | 260—584 X |
| 3,031,505 | 4/62 | Pollitzer | 260—584 |

CHARLES B. PARKER, *Primary Examiner.*

JOSEPH P. BRUST, *Examiner.*